United States Patent [19]

Aromando

[11] 4,082,382
[45] Apr. 4, 1978

[54] METHOD FOR MANUFACTURING BALL BEARINGS; A SINTERED METAL OUTER RACE PREFORM FOR USE THEREIN; AND A BALL BEARING PRODUCED THEREBY

[75] Inventor: Nick A. Aromando, Lyndhurst, N.J.

[73] Assignee: Hillside Metal Products, Inc., Newark, N.J.

[21] Appl. No.: 724,017

[22] Filed: Sep. 16, 1976

Related U.S. Application Data

[60] Division of Ser. No. 435,683, Jan. 23, 1974, Pat. No. 4,017,951, and a continuation-in-part of Ser. No. 324,733, Jan. 18, 1973, abandoned.

[51] Int. Cl.² ............................................. F16C 33/36
[52] U.S. Cl. ................................................... 308/190
[58] Field of Search ...................... 308/190, 21.5, 191

[56] References Cited
U.S. PATENT DOCUMENTS

| | | | |
|---|---|---|---|
| 3,365,253 | 1/1968 | Haller | 308/190 |
| 3,418,704 | 12/1968 | Oddsen | 308/191 X |

Primary Examiner—Joseph F. Peters, Jr.
Assistant Examiner—Gene A. Church
Attorney, Agent, or Firm—Carella, Bain, Gilfillan & Rhodes

[57] ABSTRACT

A method for manufacturing ball bearings and a sintered metal outer race preform for use therein in which the method comprises the steps of forming a generally annular sintered metal outer race preform, the preform preferably having a composition of a 97-99.4% iron and 0.60 to 1.00% carbon; the preform being fabricated from sintered metal powder and having a sinter density of approximately 6.1 to 6.5 grams per cubic centimeter and a sintered hardness of Rb 20 to 40; the preform having arcuate, concentrically disposed inner and outer annular faces, the inner face having a radially inwardly disposed curvilinear portion on one side thereof, and an annular side face on the side of the preform opposite the said curvilinear portion joining the inner and outer arcuate faces; the said side face having a concentric generally wedge-shaped annular flange thicker at its bottom than at its top and having a wall distal to the said annular face, preferably formed as part of a generally V-shaped groove in the said side face, the said wall distal to the said inner annular face being straight from top to bottom and extending at an oblique angle of preferably approximately 45° to the normal to the said side face; positioning an inner face within the annulus defined by the outer race; positioning a plurality of balls intermediate the inner and outer races; and deforming at least a portion of the said flange radially inwardly to generate an entrapment for the said balls between the said inner face of the preform and the inner race; the said deformation preferably being achieved by advancing a generally annular deforming tool having an annular face, straight from its top to its bottom, disposed at an angle of approximately 5° from the plane of said side face of the preform, perpendicularly thereto to engage the top of said flange until it is deformed radially inwardly sufficiently to entrap the balls to the extent desired.

22 Claims, 5 Drawing Figures

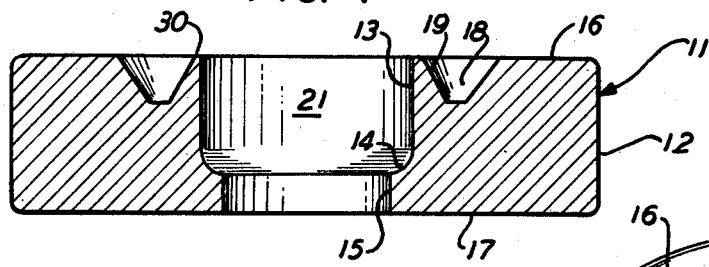
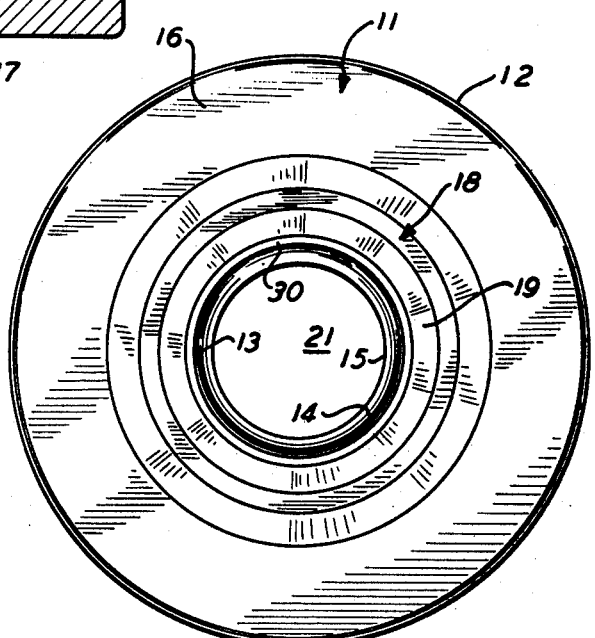
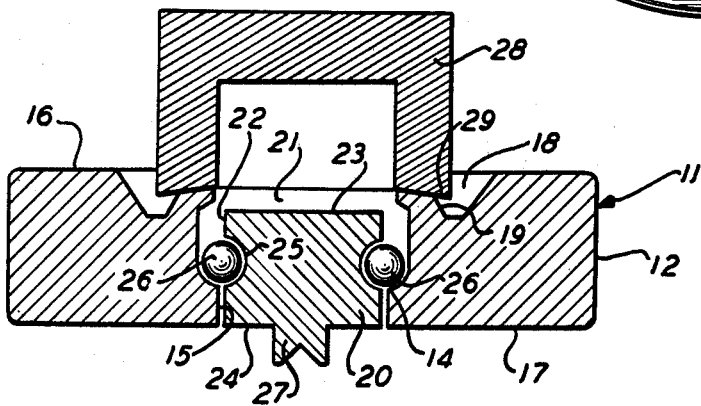

METHOD FOR MANUFACTURING BALL BEARINGS; A SINTERED METAL OUTER RACE PREFORM FOR USE THEREIN; AND A BALL BEARING PRODUCED THEREBY

CROSS REFERENCE TO RELATED APPLICATIONS

This is a division, of application Ser. No. 435,683 filed Jan. 23, 1974, now U.S. Pat. No. 4,017,951.

This application is also a continuation-in-part of Application Serial No. 324,733, filed on January 18, 1973, now abandoned, in the name of Nick A. Aromando and assigned to the same assignee as the present application.

BACKGROUND OF THE INVENTION

There are a wide variety of ball bearings available today comprising fundamentally a generally annular outer race; a generally cylindrical inner race; opposed curvilinear faces on the outer and inner race defining a raceway and a plurality of ball bearings enclosed within the said raceway.

Commonly, ball bearings of the character above described are fabricated from sheet metal which has been appropriately deformed generally as disclosed in U.S. Pat. Nos. 3,317,257; 3,633,982 and 3,667,097. However, sheet metal ball bearings have been found lacking in sufficient strength necessary for many applications. Additionally, sheet metal formed bearings are relatively costly because of the large number of forming steps required.

Optionally, ball bearings of the character described may be fabricated by machining roll-stock. However, machined ball bearings are even more costly than those formed from sheet metal.

It is among the objects and advantages of the present invention to provide a method for manufacturing ball bearings by employing an outer race preform fabricated of metal powder which has been appropriately molded and sintered. Such a preform is substantially less expensive to fabricate than the deforming of sheet metal and results in a ball bearing which is substantially stronger than those formed from sheet metal.

It is another object of the present invention to provide a method for manufacturing ball bearings employing the sintered metal outer race preform aforesaid including the step of deforming a portion of the preform adjacent to the raceway to entrap the ball bearings in such a fashion that the ball bearing entrapment is extremely resistant to wear and breakage.

Still another object of the present invention is to provide a method for deforming the aforesaid preform which produces a deformed radially inwardly disposed lip enclosing and entrapping the ball bearings intermediate the inner and outer race, which lip is extremely resistant to fracture due to mechanical stress.

Still yet another object of the present invention is to provide an annular outer race preform having an annular generally wedge-shaped annular flange concentrically disposed on one side face thereof which has a wall, flat from its top to its bottom, distal to and obliquely disposed to the axis of the annulus, which flange is deformable radially inwardly by a tool having a working wall straight from side to side engageable thereto to generate a radially inwardly disposed ball bearing entrapping lip preferably having a generally flat outer face which lip, when formed in said fashion, has superior resistance to fracture under stress.

SUMMARY OF THE INVENTION

A method for manufacturing ball bearings having a generally annular outer race of molded and sintered metal powder, a cooperative inner race within an annulus defined by the outer race and a plurality of ball bearings entrapped in a raceway formed by the inner and outer races comprising forming a generally annular outer race preform of molded and sintered metal powder; said preform having substantially concentric inner and outer annular faces, the said inner annular face having first ball bearing entrapment means, preferably a radially inwardly disposed curvilinear portion, and an annular side face joining said inner and outer annular faces having a generally annular, wedge-shaped flange substantially concentric with the inner and outer annular faces, the wall of said flange distal to said annulus being straight from top to bottom; positioning the inner race within the said annulus; positioning a plurality of ball bearings intermediate the inner and outer race; the ball bearings being entrapped on one side by said first entrapment means on the inner annular face of the outer race; deforming at least a portion of said wedge-shaped flange radially inwardly to generate second entrapment means from the deformed portion which entraps the ball bearings between the inner and outer races on the side of the preform opposite the said first entrapment means.

An annular ball bearing outer race preform having an inner annulus comprising an integrally formed, generally annular outer race body member of molded and sintered metal powder having an annular outer face defining the rolling periphery of said bearing; an inner annular face on the outer race body member contiguous to the said annulus and concentrically disposed in spaced relationship with respect to said annular outer face; first ball bearing entrapment means on the outer race, preferably a radially inwardly disposed curvilinear portion on said annular inner face; an annular side face on the body member intermediate the inner and outer faces; a generally annular wedge-shaped flange on said side face substantially concentric with the annular inner and outer faces; and a wall on said flange, straight from top to bottom, distal to the said annulus and disposed obliquely upwardly toward the said annulus.

A ball bearing comprising an integrally formed, generally annular outer race of molded and sintered metal powder, the outer race defining an annulus; an annular outer face on the outer race defining the rolling periphery of the bearing; an inner race disposed generally concentrically within the said annulus; an annular inner face on the outer face contiguous to the annulus; a radially inwardly disposed arcuate groove on the inner race defining a raceway; a plurality of ball bearings in the raceway; a radially inwardly disposed curvilinear portion on the said inner annular face of the outer race defining a first entrapment for said ball bearings on one side of the raceway; a second entrapment for said ball bearing formed integrally from the outer race opposite said first entrapment, the second entrapment formed by deforming an annular generally wedge shaped flange on the outer race proximal to the annulus, the said flange having a wall distal to the annulus which prior to deforming is straight from top to bottom and extends obliquely outwardly toward the axis of the annulus; the said flange being deformed by engagement with a deforming tool having a working face straight from side to side which tool is progressively advanced against said flange generally parallel to the axis of the annulus.

PREFERRED EMBODIMENT OF INVENTION

The objects and advantages as aforesaid as well as other objects and advantages may be achieved by the methods hereinafter described which employ a sintered powdered metal outer race preform preferred embodiments of which are illustrated in the drawings in which:

FIG. 1 is a side elevational cross-sectional view of the sintered metal preform;

FIG. 2 is a top plan view thereof;

FIG. 3 is a side elevational cross-sectional view of the preform with an inner race positioned within the annulus defined by the preform with ball bearings intermediate the inner and outer race and a deforming tool engaged to the outer race in the preliminary stages of deformation;

Figure 4:
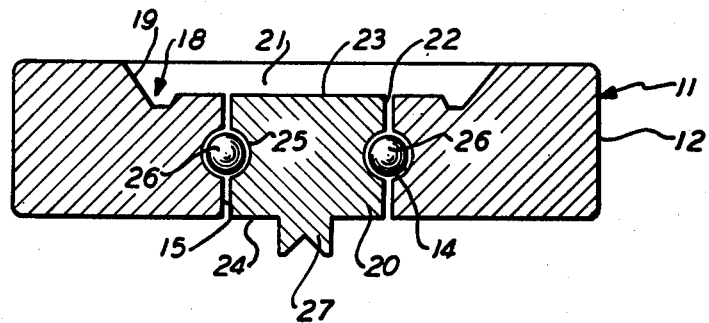
FIG. 4 is a side elevational cross-sectional view of the ball bearing after completion of deformation of the outer race to enclose the balls in the raceway.

Referring now to the drawings in detail, and in particular to FIGS. 1 to 4, the outer race preform 11 has a generally annular configuration and comprises an annular outer face or bearing surface 12 and an inner annular face 13 concentric therewith. The inner concentric face 13 has a radially inwardly disposed curvilinear portion 14 on one side communicating with a cylindrical opening 15 concentric with the outer face 12 and inner face 13.

The preform 11 is provided with opposed, generally annular side faces 16 and 17 which preferably are perpendicular to the outer face 12 and inner face 13. Side face 16 opposite the cylindrical opening 15 is provided with a generally V-shaped groove 18 concentric with the outer face 12 and the inner face 13. The groove 18 defines an annular flange 31 generally concentric with the inner face 13 and outer face 12. Wall 19 of the flange 31 is straight from its top to bottom and extends obliquely upwardly from the bottom of groove 18 toward the annulus 21 preferably at an angle of approximately 45° from the plane of side face 16.

The outer race preform 11 is fabricated from metal powder and preferably has a composition consisting essentially of from 97% to 99.4% iron and 0.60% to 1.00% carbon. The metal powder is first molded in the shape of the preform and the green-stock is thereafter sintered to reach a density of from approximately 6.8 to 7.2 grams per cubic centimeter with a hardness of from approximately Rb 20 to Rb 40.

By way of illustration, a typical composition for the outer race preform consists essentially of 98.5% iron, 0.5% carbon and 1% other compositions including sulfur approximately 0.006%; phosphorus 0.011%; manganese 0.22%; silicon 0.073% and acid insolubles 0.13%.

After deformation to complete the ball bearing structure as hereinafter described, the entire ball bearing is annealed to achieve an ultimate tensile strength of approximately 74,000 psi having had a tensile strength prior to annealing of approximately 44,000 psi with a yield point before annealing of 28,000 psi. The annealing procedures are well known in the art and need be described no further.

In order to produce the finished bearing, an inner race 20 is positioned within the annulus 21 defined by the preform 11 as illustrated in FIG. 3. The inner race 20 is integral and defines an annular outer face 22 and a pair of spaced-apart opposed side faces 23 and 24 which are preferably perpendicular to the outer annular face 22. The outer annular face 22 is provided with a radially reduced curvilinear groove 25 shaped and dimensioned generally to conform to ball bearings 26, positioned intermediate the outer race preform 11 and the inner race 20.

The inner race 20 may be optionally provided with a mounting shaft 27 or a transverse passage (not shown).

After the inner race 20 and ball bearings 26 are positioned within the annulus 21 of the annulur outer race preform 11, the flange 31 defined by the V-shaped annular groove 18 must be deformed radially inwardly to overlie a portion of the ball bearings 26 thereby positively entrapping them within the raceway defined between the inner race 20 and outer race preform 11. However, the deformed flange 31 must be sufficiently strong against mechanical stress to resist fracture or damage which would render the bearing inoperative or subject to excessive wear under normal operating conditions.

The usual procedure for deforming the flange 31 radially inwardly would be to provide the wall thereof distal to the annulus 21 with an inwardly disposed radius and to engage that wall with a deforming tool having a generally conforming radius. However, after exhaustive tests, it has been determined that if the said wall 19 of the groove 18 is anything other than straight from top to bottom it is relatively weak and subject to fracture or excessive wear when deformed. Therefore, it is essential that the outer race preform 11 be provided with a flange wall distal to the annulus 21, wall 19 in FIGS. 1 to 4, which is flat and disposed obliquely toward the axis of the annulus 21, the flange 31 being wider at the bottom than at the top.

In order to generate deformation of the wall 19 radially inwardly, an annular deforming tool 28 having a straight face from side to side is employed. Here again, it has been found that the use of a deforming tool with a radius, even when the wall 19 is straight from top to bottom, produces a deformed wall having inferior stress resistance characteristics.

Preferably, the deforming tool 28 is provided with an annular forming face 29 straight from side to side which is preferably disposed at an angle of approximately 5° to 25° to the face 16 of the outer race preform 11, with approximately 5° being preferred, is advanced preferably perpendicularly to the face 16 to engage the top 30 of the flange 31. As the deforming tool 28 is advanced toward the face 16 the flange 31 is progressively deformed radially inwardly as illustrated in FIG. 4. The deforming tool is advanced a predetermined distance which is a function of the degree of play desired in the ball bearings.

It has been found that the wall 19 of the V-shaped groove 18 in FIGS. 1 to 4, preferably should be disposed at an angle of approximately 45° to the plane of the face 16 of the preform 11 extending obliquely outwardly toward the annular bearing surface face 12. The depth of the groove 18 is a function of the mass of metal in the deformable portion of the flange 31, the size of the entire bearing structure, the size of the ball bearings 26, the depth of the inner face 13 of the preform 11 and the like. Merely by way of illustration, in a bearing having an outer diameter across the outer face 12 of 1⅛ inches and a diameter across the inner face 13 of 0.662 inches and a thickness from side face 16 to side face 17 of 9/32 inches with a depth of the cylindrical opening of 0.075 inches, the V-shaped groove 18 preferably has a depth of 3/64 to ⅛ inches with 1/16 inches being preferred.

Figure 5:
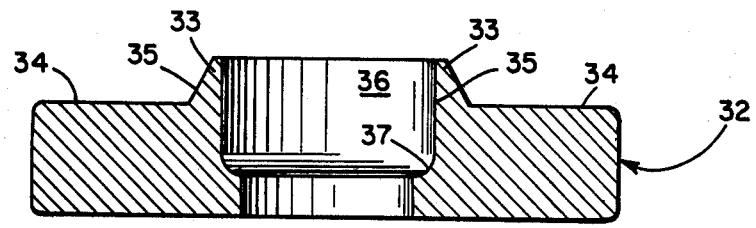
FIG. 5 is a side elevational, cross-sectional view of an alternate form of sintered powdered metal preform.

FIG. 5 illustrates an alternate embodiment of the invention's preform. The preform 32 in FIG. 5 is substantially the same as the preform 11 in FIGS. 1 to 4 with the exception that the deformable flange 33 extends above the side face 34 effectively eliminating the groove 18 of FIGS. 1 to 4. In all other respects, the preform 32 is the same as preform 11 and the method of assembly and deformation of the flange 33 is also the same.

The wall 35 of flange 33 distal to the annulus 36 is straight from top to bottom and disposed obliquely to the axis of the annulus 36 at the angles set forth for wall 19 with respect to preform 11. The flange 33 is deformed by a deforming tool having the same characteristics as deforming tool 28.

In both forms of the outer race preform illustrated in FIGS. 1 and 5, respectively, a curvilinear portion on the inner annular face, respectively 14 and 37, is shown. This curvilinear portion functions as a first ball bearing entrapment means and facilitates assembly prior to deformation of the wall 19 in FIG. 1 and flange 33 in FIG. 5 which when deformed function as second ball bearing entrapment means. However, it is possible to provide deformable flanges such as flange 33 on both sides of the annulus of the outer race and deform one to provide first entrapment means. Simultaneous deformation of opposed flanges is also possible. Such techniques are contemplated as being within the scope of the claims appended hereto.

It is submitted to be manifest that many modifications and variations to the structure disclosed may be made without departing from the spirit of the present invention.

What is claimed is:

1. An annular ball bearing outer race preform having an inner annulus comprising:
    (a) an integrally formed, generally annular outer race body member of molded and sintered metal powder having an annular outer face defining the rolling periphery of said bearing,
    (b) an inner annular face on the outer race body member contiguous to said annulus and concentrically disposed in spaced relationship with respect to said annular outer face,
    (c) radially inwardly disposed first ball bearing entrapment means on said annular inner face,
    (d) a side face on the body member joining the inner and outer annular faces,
    (e) a generally annular wedge-shaped flange on said face substantially concentric with the inner and outer faces,
    (f) a wall on said flange straight from top to bottom, distal to said annulus extending from the side face obliquely upwards toward the said annulus, and
    (g) the said flange being deformed by engagement with a deforming tool having a working face straight from side to side which tool is progressively advanced against said flange generally parallel to the axis of the annulus.

2. An annular ball bearing outer race preform comprising:
    (a) the structure in accordance with claim 1 in which
    (b) the preform body member has a sintered density of approximately 6.8 to 7.2 grams per cubic centimeter before deformation of said flange.

3. An annular ball bearing outer race preform comprising:
    (a) the structure in accordance with claim 1 in which
    (b) the preform body member has a sintered tensile strength of approximately 44,000 psi and a yield point of approximately 28,000 psi before deformation of said flange.

4. An annular ball bearing outer race preform comprising:
    (a) the structure in accordance with claim 1 in which
    (b) the preform body member has a composition of from approximately 97% to 99.4% iron and approximately 0.60% to 1.00% carbon before deformation of said flange.

5. An annular ball bearing outer race preform comprising:
    (a) the structure in accordance with claim 2 in which
    (b) the preform body member has a sintered tensile strength of approximately 44,000 psi and a yield point of 28,000 psi before deformation of said flange.

6. An annular ball bearing outer race preform comprising:
    (a) the structure in accordance with claim 1 in which
    (b) the said side face of the outer race is provided with a groove generally concentric to the annulus,
    (c) the said wedge shaped flange being that portion of the outer race intermediate the groove and the annulus.

7. An annular ball bearing outer race preform comprising:
    (a) the structure in accordance with claim 6 in which
    (b) the preform body member has a sintered density of approximately 6.8 to 7.2 grams per cubic centimeter before deformation of said flange.

8. An annular ball bearing outer race preform comprising:
    (a) the structure in accordance with claim 6 in which
    (b) the preform body member has a sintered tensile strength of approximately 44,000 psi and a yield point of approximately 28,000 psi before deformation of said flange.

9. An annular ball bearing outer race preform comprising:
    (a) the structure in accordance with claim 6 in which
    (b) the preform body member has a composition of from approximately 97% to 99.4% iron and approximately 0.60% to 1.00% carbon before deformation of said flange.

10. An annular ball bearing outer race preform comprising:
    (a) the structure in accordance with claim 7 in which
    (b) the preform body member has a sintered tensile strength of approximately 44,000 psi and a yield point of 28,000 psi before deformation of said flange.

11. An annular ball bearing race preform having an inner annulus comprising:
    (a) the structure in accordance with claim 1 in which
    (b) the said first ball bearing entrapment means is a radially inwardly disposed curvilinear portion on said inner annular face of the outer race.

12. A ball bearing comprising:

(a) an integrally formed, generally annular outer race of molded and sintered metal powder, the outer race defining an annulus,
(b) an annular outer face on the outer race defining the rolling periphery of the bearing,
(c) an inner race disposed generally concentrically within the said annulus,
(d) an annular inner face on the outer race contiguous to the annulus,
(e) a radially inwardly disposed arcuate groove on the inner race defining a raceway,
(f) a plurality of ball bearings in the raceway,
(g) radially inwardly disposed first ball bearing entrapment means on the said inner annular face of the outer race on one side of the raceway,
(h) second ball bearing entrapment means formed integrally from the outer race opposite said first entrapment means, the second entrapment means formed by deforming an annular generally wedge shaped flange on the outer race proximal to the annulus, the said flange having a wall distal to the annulus which prior to deforming is straight from top to bottom and extends obliquely outwardly toward the axis of the annulus,
(i) the said flange being deformed by engagement with a deforming tool having a working face straight from side to side which tool is progressively advanced against said flange generally parallel to the axis of the annulus.

13. A ball bearing comprising:
(a) the structure in accordance with claim 12 in which,
(b) the outer race has a sintered tensile strength of approximately 44,000 psi and a yield strength of approximately 28,000 psi before formation of said flange.

14. A ball bearing comprising:
(a) the structure in accordance with claim 12 in which,
(b) the outer race has an annealed tensile strength of approximately 74,000 psi after deformation of said flange.

15. A ball bearing comprising:
(a) the structure in accordance with claim 12 in which,
(b) the outer race has an annealed tensile strength of approximately 74,000 psi after deformation of the said flange.

16. A ball bearing comprising:
(a) the structure in accordance with claim 12 in which,
(b) the outer race has a sintered density of approximately 6.8 to 7.2 grams per cubic centimeter before deformation of said flange.

17. A ball bearing comprising:
(a) the structure in accordance with claim 12 in which
(b) the said side face of the outer race is provided with a groove generally concentric to the annulus,
(c) the said wedge shaped flange being that portion of the outer race intermediate the groove and the annulus.

18. A ball bearing comprising:
(a) the structure in accordance with claim 17 in which,
(b) the outer race has a sintered tensile strength of approximately 44,000 psi and a yield strength of approximately 28,000 psi before deformation of said flange.

19. A ball bearing comprising:
(a) the structure in accordance with claim 17 in which,
(b) the outer race has an annealed tensile strength of approximately 74,000 psi after deformation of the said flange.

20. A ball bearing comprising:
(a) the structure in accordance with claim 18 in which,
(b) the outer race has an annealed tensile strength of approximately 74,000 psi after deformation of the said flange.

21. A ball bearing comprising:
(a) the structure in accordance with claim 20, in which,
(b) the outer race has a sintered density of approximately 6.8 to 7.2 grams per cubic centimeter before deformation of said flange.

22. A ball bearing comprising:
(a) the structure in accordance with claim 12 in which
(b) the said first ball bearing entrapment means is a radially inwardly disposed curvilinear portion on said inner annular face of the outer race.

* * * * *